A. WEBER.
CRANK PIN TURNING TOOL.
APPLICATION FILED FEB. 10, 1920.
1,389,541.
Patented Aug. 30, 1921.
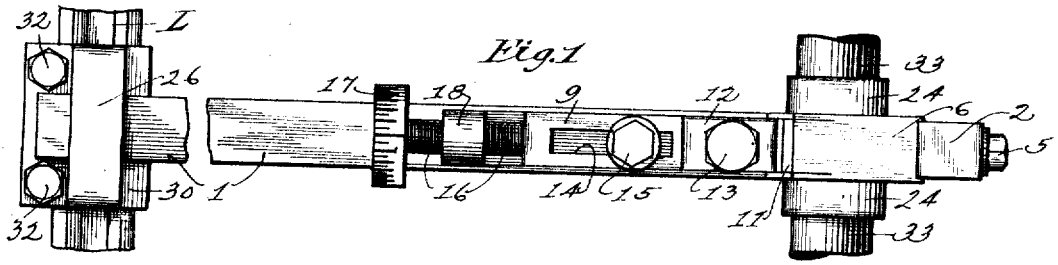
Fig. 1
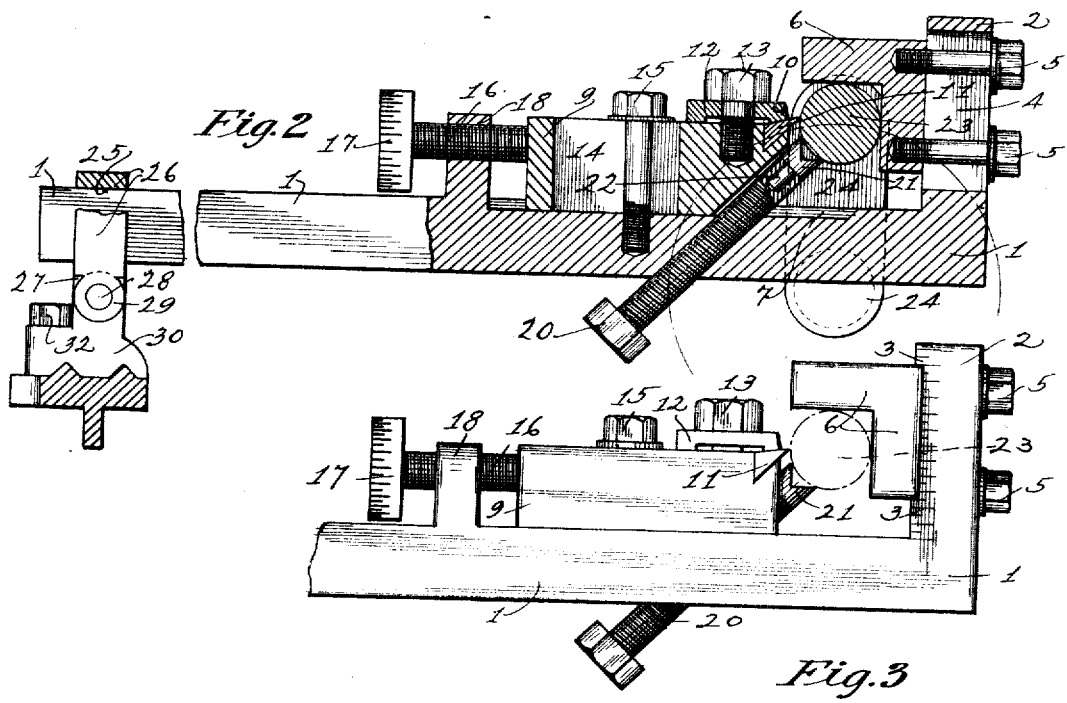
Fig. 2
Fig. 3
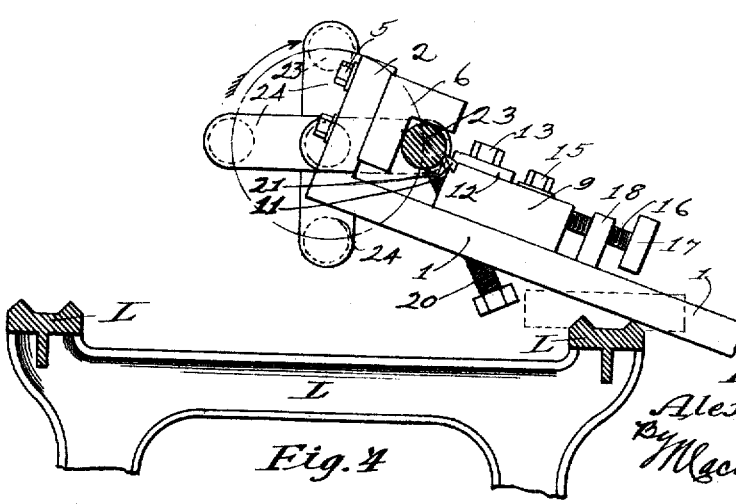
Fig. 4
INVENTOR:
Alexander Weber,

UNITED STATES PATENT OFFICE.

ALEXANDER WEBER, OF LOS ANGELES, CALIFORNIA, ASSIGNOR TO SAWYER-WEBER TOOL MANUFACTURING COMPANY, A CORPORATION OF CALIFORNIA.

CRANK-PIN-TURNING TOOL.

1,389,544.

Specification of Letters Patent.

Patented Aug. 30, 1921.

Application filed February 10, 1920. Serial No. 357,721.

*To all whom it may concern:*

Be it known that I, ALEXANDER WEBER, a citizen of the United States, and a resident of Los Angeles, in the county of Los Angeles and State of California, and whose post-office address is 350 South Alameda street, Los Angeles, California, have invented new and useful Improvements in Crank-Pin-Turning Tools, of which the following is a specification.

This invention relates to and has for a principal object the provision of a suitable tool for turning the pins of crank shafts as are employed in the operation of internal combustion engines, so that all of said pins may be of equal diameter and perfectly smooth and free from the circumferential marks usually formed by the tool in a usual turning operation.

A further object is to provide a tool of the character stated having relatively adjustable means for holding a tool and for holding the crank pins, whereby the same implement may be adjusted for turning the pin of crank shafts of different size.

Another object is to provide a crank pin turning tool having a body provided with a plurality of rests for engagement with the crank pins in the turning operation, and means for adjusting said rests and the turning tool relatively, for positioning the tool relative to the pins and for accommodating the implement to crank shafts of different size.

A further object is to provide a body having a tool holder thereon and arranged for supporting the tool in a plane substantially spaced from said body, and relatively adjustable means including a bearing surface for the crank pin spaced from said body at a greater distance than said tool, whereby the pin and tool may be properly supported for a turning operation.

Other objects include the provision of a single tool having a cutting edge extending the full length of the surface to be turned and disposed with said cutting edge parallel to the axis of the pin to be turned, the provision of means, whereby, after the first pin of a set has been turned, all succeeding pins may be turned to a like extent and to diameters equal to the first pin by a single setting of the tool.

With the foregoing and other objects in view my invention consists in the combination and arrangement of parts and in the details of construction shown in the drawings appended hereto and hereinafter completely described in detail and claimed; it being understood that I may substantially vary and alter, or modify the structure from the form shown, without enlarging the scope or departing from the spirit of my invention, except as I may be limited by the appended claims.

In the drawings hereinafter referred to and forming a part of this application, I have shown one practical embodiment of my invention, wherein:

Figure 1 is a plan of my improved tool shown in connection with a portion of a crank shaft;

Fig. 2 is a side elevation thereof, partly in section;

Fig. 3 is a full side elevation;

Fig. 4 is a transverse sectional elevation of a portion of lathe showing a crank shaft and my turning tool operatively held therein.

Throughout the specification and in the several views of the drawing I have indicated the same and like parts by means of similar characters of reference.

Preliminary to the detailed description of my device it will be understood that crank shaft pins during constant use become uneven on their peripheries and frequently slightly out of parallel and eccentric, thus rendering the operation of the engine, or motor in which they are used noisy, uneven and causing an undue amount of vibration. It is for the purpose, therefore, of truing up the crank shafts, both peripherally and longitudinally, that I have provided the device which I will now describe. Though the structure of my device may change, depending upon the use to which it is put, or in accordance with the manner of mounting the device for use, I have indicated a preferred form in the drawings which includes a main body 1 having an extension 2 at one end. Said extension 2 is shown integrally formed with the body 1 but may be separable therefrom and detachable therefrom, if desired, and also, said extension 2 may be provided at any convenient point at or near one end substantially spaced from one end, if desired. Also, the extension 2 is shown at right angles to body 1 but the same may be disposed at any suitable angle relative to the body. I have shown a bracket 6 of angular cross section detachably and adjustably held on the inner face of the extension 2 by means of a pair of cap screws 5 which are extended through an elongated vertical slot 4 in extension 2 and are threaded at their ends into one of the legs of the bracket 6. By reference to Fig. 3, it will be observed that I have indicated a scale of graduations on one face of the extension 2, which may represent inches or fractions thereof, whereby the bracket 6 may be vertically adjusted on the extension 2, for purposes hereinafter described.

A suitable tool carriage 9 is adjustably held on the upper face of the body 1, the lower portion thereof having a tongue 8 which slidably engages a groove 7 in the upper face of body 1 and an elongated vertical slot 14 being provided in the central portion of the carriage for receiving a cap screw 15 adapted to be extended through said slot and threaded at its lower end into the body 1, as shown in Fig. 2.

The carriage may be adjusted on the body by means of a screw 16 threaded through a suitable lug 18 on the body 1, the inner end of said screw engaging the rear end of said carriage and the head 17 of said screw having a suitable dial with a scale thereon for setting the screw so as to limit the movement of the carriage. It is, of course, understood, that the cap screw 15 is first loosened before the carriage may be adjusted by means of the screw 16.

A tool 11 is adapted to be held in a transverse groove 10 formed in the forward and upper edge of the carriage 9 by means of a holder 12 which is attached to the carriage 8 by means of a cap screw 13, one portion of said holder engaging the upper face of the carriage and the other portion thereof engaging the upper face of the tool, as shown in Fig. 2.

It will be understood, by reference to Figs. 1 and 2, that the crank pin 23 of crank shaft 24, when the tool is properly positioned thereon, will be disposed so that its axis is transversely of the body 1 of the device. It is necessary, in order to attach the device to the crank shaft to provide means for adjusting either the extension 2 or the carriage 9 so as to provide an opening between the adjacent portion of said carriage and the bracket 6, or between the tool 11 and bracket 6, to permit the passage of the pin 23 therebetween when the device is placed in position over the pin. Therefore, when the device is positioned, the carriage 9, in the form of device shown, will first be moved backwardly on the body 1, for a distance sufficient for the purpose stated. After the pin is inserted between the carriage 9 and extension 2, then the carriage may be adjusted forwardly again so that the cutting edge of the tool 11 will engage the periphery of the pin 23 and the inner surface of two legs of the bracket 6 will provide bearing surfaces against which the pin 23 will rest. In this connection, it will be understood that it is essential that one of the bearing surfaces, or rests provided on bracket 6 should be substantially opposite the cutting edge of the tool 11, and the other of said bearing surfaces should be preferably at right angles thereto and spaced from the horizontal line of the tool edge for a distance equal to the nominal radius of the pin to be turned. This positioning of the pin 23 may be accomplished to a nicety by means of the scale shown on the side of extension 2.

Now, in some cases at least, the two bearing surfaces, or rests provided on bracket 6 may be sufficient to hold the pin 23 centered relative to the tool, but I prefer to provide an additional rest, as shown in Figs. 2 and 3. This device includes an adjusting screw 20 having a swivel tip 21 thereon with a V groove in the end of said tip for engagement with the periphery of the pin 23, and a stem 22 seated in the end of the screw. I prefer to mount the screw 20 so that an axial line of the screw would bisect the angle of the bracket 6, as shown in Fig. 2.

I may use my device in several ways with equally good results, depending upon the character of the shaft and the facilities available for use. One manner of mounting the device for use is shown in Figs. 1, 2 and 3, and includes a bracket 30 adapted to be attached to the bed L of a lathe by means of one or more screws 32, or otherwise and having lugs 29 thereon between which a lug 27 of a sleeve 26 is pivotally held on a shaft 28; said sleeve having an opening 25 therethrough for slidably receiving the body 1 of my device. Now, it will be understood that when the bearing ends 33, 33, of the crank shaft are centered in a lathe and held, respectively, in the chuck or tail stock, the pins 23 will rotate in circles concentric relative to the axis of said bearings 33. Likewise, when the turning device is mounted on the crank shaft and attached to the lathe as stated, the main portion thereof will rotate, connecting rod fashion, around the axis of said bearings, and the tool 11 will move in a circle eccentric relative to the axis of the pin 23. The extended portion of the body 1 will slide in the sleeve 26 on bracket 30 in a manner similar to the movement of a piston in a cylinder.

As shown in Fig. 4, I may omit the bracket 30 and sleeve 26 altogether and allow the end of the body 1 to rest upon and slidably engage the lathe guides L as the crank is turned in the lathe. For instance, if the lathe is operated in a clock-wise direction, the body 1 will engage the right hand guide L and if operated reversely said body will engage the left hand guide of the lathe. With the use of the bracket 30 and sleeve 26 it will be observed that the body 1 will at all times be held in a true transverse plane relative to the axis of the lathe, and thus, if the pins 23 are irregular or out of parallel with each other and with bearing 33, this condition will be corrected in the operation of the device, for the sleeve 26 will hold the body 1 in a transverse plane in the lathe and the tool 11 is held in a true plane on said body and such imperfections will be corrected automatically.

In the latter form of device, however, where the bracket and sleeve are omitted, I may accomplish the same results by sliding the tool carriage of the lathe along the guides L until the end thereof engages the body 1 of the turning device. Any irregularities in the pins 23 will be greatly accentuated in the movement of the outer end of body 1 and so that the same may be readily discernible at the end of body 1. The tool carriage may then be moved for a distance equal to one half of the total variation of the body 1, whereupon the said body will slide against the end of the tool carriage and cause a greater pressure to be exerted by the tool on the pin 23 at one end than at the other end. This will continue until the pin has been made perfectly true and parallel with the other pins, or with bearings 33. I have shown the tool carriage of the lathe in the drawing, any one skilled in the use of machine tools will readily understand the operation described.

In other words, especially where a lathe may not be available, the crank shaft may be held in one or more vises or other suitable holding means, and the device of my invention rotated around the axis of the bearing portions 33 of the crank shaft instead of as hereinbefore described. In this case the body 1 may be grasped in the hand of the mechanic for rotating the tool body, the same result being accomplished as in the other cases.

When the first pin of a set is finished to a smooth surface, the adjusting screw 16 may be set so as to limit the rearward movement of the carriage 9, the reading of the scale thereon being noted, and other pins of the set may thereafter be turned to an exact extent and diameter.

What I claim is:

1. A crank pin turning device including a body member, a block adjustable thereon and having angularly disposed bearing plates for engagement with the work, a tool adjustable on said body member and having its cutting edge disposed in a plane cutting the axis of the work, and means for confining the work between said body and said block.

2. A crank pin turning device comprising a body member, work engaging means on said body including a member having bearing surfaces disposed at right angles, one of said surfaces being parallel with the adjacent surface of said body, a relatively adjustable tool supported on said body, and movable at right angles to the plane of said work engaging members, and means for confining the work between said tool and said bearing surface, the cutting edge of said tool being in a plane cutting the axis of the work.

3. A crank pin turning device including a body, a relatively adjustable extension and a tool carriage on said body, a tool held on said carriage and having a cutting edge equal in length to the pins to be turned and paralleling the axis of said pins, and means on said extension for conning a crank pin between said tool and said extension in a turning operation, and an auxiliary rest below the cutting line of said tool for centering the crank pins relative to said confining means.

4. A crank pin turning device comprising a body member, work engaging means thereon having a bearing, a bearing surface disposed substantially at right angles to the adjacent surface of said body and another bearing surface substantially at right angles to said first mentioned bearing surface, a tool adjustable relative to said work engaging means and disposed in a plane intermediate said body and said last mentioned bearing surface, and means for confining the work for a turning operation.

5. A crank pin turning device including a body, an extension on said body, a bracket carried on said extension and having angularly related bearing surfaces for engagement with different portions of the periphery of the crank pins, a tool operatively held intermediate one of said bearing surfaces and said body, and means for relatively adjusting said tool and said extension.

6. A crank pin turning device including a body, an extension on said body, means on said extension having angularly related bearing surfaces for engagement with different portions of the periphery of the crank pins, a tool intermediate one of said surfaces and said body for engagement with said pin, and an auxiliary rest carried on said body and disposed in a plane cutting the axis of said crank pin, as set forth.

7. A crank pin turning device including a body, having a vertical extension thereon, a V block adjustable on said extension, a tool adjustable relative to said block and disposed in a plane intermediate the outer surface of said block and said body, and means for advancing and retracting said tool relative to the work.

8. A crank pin turning device including a body, a bearing member disposed in a vertical plane relative thereto, another bearing member disposed in a plane parallel with said body, an adjustable device on said body for engagement with and for holding the work in engagement with said parallel bearing member, and a tool adjustable relative to and for holding the work in engagement with said vertical bearing member.

9. A crank pin turning device having an elongated body, a relatively adjustable work engaging member, and a cutting tool supported on said body in the plane of the axis of the work, said work engaging means including an angularly faced member having right angularly disposed surfaces adapted to engage different portions of the periphery of the work, and said work being confined within the angle of said surfaces, and held thereagainst when said tool is operatively held relatively thereto.

Signed at Los Angeles, in the county of Los Angeles, and State of California.

ALEXANDER WEBER.

In presence of—
LUTHER L. MACK,
CHARLES C. MONTGOMERY.